US008977855B2

(12) United States Patent
Kolesnikov et al.

(10) Patent No.: US 8,977,855 B2
(45) Date of Patent: Mar. 10, 2015

(54) SECURE FUNCTION EVALUATION BETWEEN SEMI-HONEST PARTIES

(75) Inventors: Vladimir Y. Kolesnikov, Jersey City, NJ (US); Ranjit Kumaresan, College Park, MD (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/562,640

(22) Filed: Jul. 31, 2012

(65) Prior Publication Data

US 2014/0040620 A1 Feb. 6, 2014

(51) Int. Cl.
*H04L 9/32* (2006.01)

(52) U.S. Cl.
USPC ........... 713/171; 713/150; 713/168; 380/149; 380/150; 705/67

(58) Field of Classification Search
None
See application file for complete search history.

(56) References Cited

U.S. PATENT DOCUMENTS

| 5,633,813 | A | * | 5/1997 | Srinivasan | 703/14 |
| 6,834,272 | B1 | * | 12/2004 | Naor et al. | 705/80 |
| 7,240,198 | B1 | * | 7/2007 | Pinkas et al. | 713/168 |
| 8,443,205 | B2 | * | 5/2013 | Kolesnikov et al. | 713/189 |
| 8,488,791 | B2 | * | 7/2013 | Baechler et al. | 380/255 |
| 2009/0175443 | A1 | * | 7/2009 | Kolesnikov et al. | 380/44 |
| 2009/0182667 | A1 | * | 7/2009 | Parkes et al. | 705/50 |
| 2010/0306543 | A1 | * | 12/2010 | Kolesnikov | 713/171 |
| 2012/0076302 | A1 | * | 3/2012 | Kolesnikov et al. | 380/259 |

OTHER PUBLICATIONS

Vladimir Kolesnikov, Gate Evaluation Secret Sharing and Secure One-Round Two-Party Computation, Dec. 3-7, 2005, ASIACRYPT.*

* cited by examiner

*Primary Examiner* — Philip Chea
*Assistant Examiner* — Khoi Le
(74) *Attorney, Agent, or Firm* — Ryan, Mason & Lewis, LLP

(57) ABSTRACT

Methods and apparatus are provided for secure function evaluation between a semi-honest client and a semi-honest server using an information-theoretic version of garbled circuits (GC). An information-theoretic version of a garbled circuit C is sliced into a sequence of shallow circuits $C_1, \ldots C_n$, that are evaluated. Consider any wire $w_j$ of C that is an output wire of $C_i$, and is an input wire of $C_{i+1}$. When a slice $C_i$ is evaluated, $C_i$'s 1-bit wire key for $w_j$ is computed by the evaluator, and then used, via oblivious transfer (OT), to obtain the wire key for the corresponding input wire of $C_{i+1}$. This process repeats until C's output wire keys are computed by the evaluator. The 1-bit wire keys of the output wires of the slice are randomly assigned to wire values.

20 Claims, 3 Drawing Sheets

SECURE FUNCTION EVALUATION BETWEEN SEMI-HONEST PARTIES

STATEMENT OF GOVERNMENT RIGHTS

The present invention was made in connection with work performed under the Intelligence Advanced Research Projects Activity (IARPA) via Department of the Interior (DOI) Contract No. D11PC20194.

FIELD OF THE INVENTION

The present invention relates generally to techniques for securing electronic transactions and, more particularly, to secure function evaluation (SFE) techniques that provide privacy to the parties of such electronic transactions.

BACKGROUND OF THE INVENTION

Two-party general secure function evaluation (SFE) allows two parties to evaluate any function on their respective inputs x and y, while maintaining the privacy of both x and y. Efficient SFE algorithms enable a variety of electronic transactions, previously impossible due to mutual mistrust of participants. For example, SFE algorithms have been employed in auctions, contract signing and distributed database mining applications. As computation and communication resources have increased, SFE has become truly practical for common use. A malicious SFE model provides a guarantee of complete privacy of the players' inputs, even when a dishonest player follows an arbitrary cheating strategy. A semi-honest SFE model assumes that the parties follow the protocol, but attempt to learn the input of the other party.

Existing generic two-party SFE algorithms typically employ Garbled Circuits (GCs). For a detailed discussion of GCs, see, for example, Y. Lindell and B. Pinkas, "A Proof of Yao's Protocol for Secure Two-Party Computation," Journal of Cryptology, 22(2):161-188 (2009). For reasonably complex functions, however, the data transfer required for SFE is prohibitive. In fact, the communication complexity of GC-based SFE protocols is dominated by the size of the GC, which can reach Megabytes or Gigabytes even for relatively small and simple functions (e.g., the GC for a single secure evaluation of the block cipher AES has size 0.5 Megabytes).

While transmission of large amounts of data is often possible, existing networks will not scale should SFE be widely deployed. This is particularly true for wireless networks, or for larger scale deployment of secure computations, e.g., by banks or service providers, with a large number of customers. Additional obstacles include energy consumption required to transmit/receive the data, and the resulting reduced battery life in mobile clients, such as smartphones. Computational load on the server is also a significant problem. Moreover, security against more powerful malicious adversaries requires the use of the standard cut-and-choose technique, which in turn requires transfer of multiple GCs.

A need remains for improved techniques for secure function evaluation where both parties are assumed to be semi-honest.

SUMMARY OF THE INVENTION

Generally, methods and apparatus are provided for secure function evaluation for semi-honest parties. According to one aspect of the invention, a server performs secure function evaluation with a client by obtaining a circuit, C, representing a function, f; preparing slices of the circuit, C, into a sequence of sub-circuits C1, ... Cl wherein each of the sub-circuits C1, ... Cl comprises a fan-out-one circuit; executing an oblivious transfer of keys for the sub-circuits C1, ... Cl, to the client for evaluation, wherein input keys of one or more of the sub-circuits C1, ... Cl, are based on output keys of a prior one of the sub-circuits C1, ... Cl; and sending one or more output translation tables to the client. The slices can be prepared, for example, by generating output secrets of a given sub-circuit $C_i$, and obtaining corresponding input secrets.

According to another aspect of the invention, a client performs secure function evaluation with a server by executing an oblivious transfer of keys for a plurality of sub-circuits C1, ... Cl, from the server for evaluation, wherein the sub-circuits C1, ... Cl are a plurality of information-theoretic garblings of slices of a circuit, C, wherein each of the sub-circuits C1, ... Cl comprises a fan-out-one circuit, and wherein input keys of one or more of the sub-circuits C1, ... Cl, are based on output keys of a prior one of the sub-circuits C1, ... Cl; evaluating the sub-circuits C1, ... Cl; using garbled input values to obtain garbled output values; receiving one or more output translation tables from the server; and generating a bit for each output wire of the circuit, C, corresponding to a wire secret obtained in evaluation of the sub-circuit $C_l$.

A more complete understanding of the present invention, as well as further features and advantages of the present invention, will be obtained by reference to the following detailed description and drawings.

DETAILED DESCRIPTION

Embodiments of the present invention improve upon existing generic two-party SFE algorithms using an information-theoretic version of garbled circuits (GC). According to one aspect of the invention, an information-theoretic version of a garbled circuit C is sliced into a sequence of shallow circuits $C_1, \ldots C_n$, that are evaluated.

In a semi-honest model, secure piece-wise secure circuit evaluation can be achieved as follows. Consider any slicing of C, where some wire $w_j$ of C is an output wire of $C_i$, and is an input wire of $C_{i+1}$. Now, when a slice $C_i$ is evaluated, $C_i$'s 1-bit wire key for $w_j$ is computed by the evaluator, and then used, via oblivious transfer (OT), to obtain the wire key for the corresponding input wire of $C_{i+1}$. This process repeats until C's output wire keys are computed by the evaluator. In order to prevent the evaluator from learning the intermediate wire values of C, the 1-bit wire keys of the output wires of the slice are randomly assigned to wire values.

Figure 1:
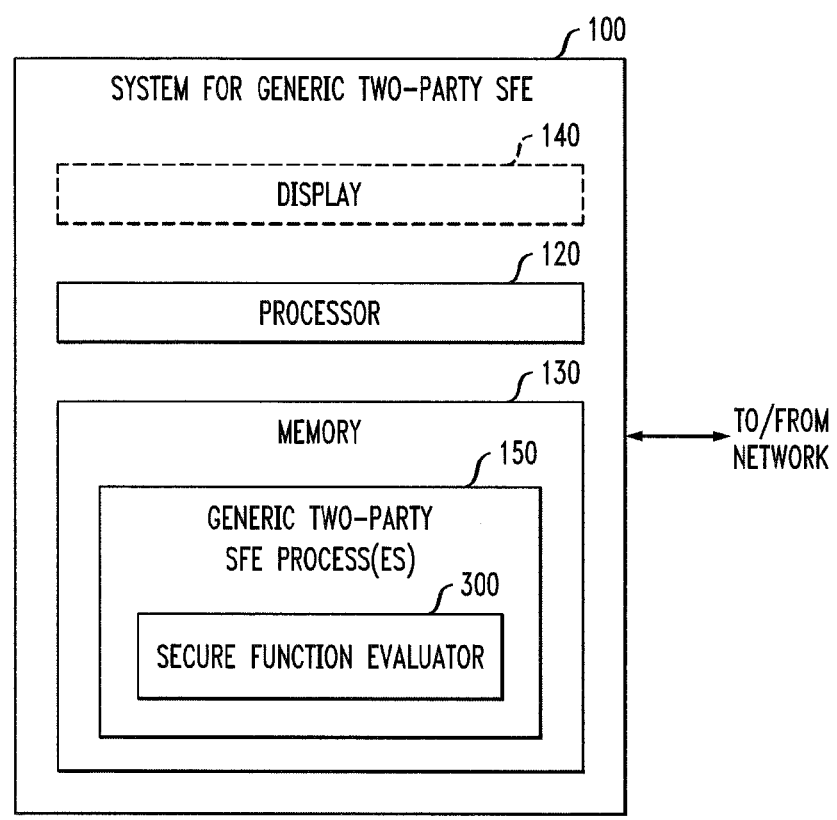
FIG. 1 is a block diagram of an improved system for generic two-party SFE that can implement the processes of the present invention.

FIG. 1 is a block diagram of an improved generic two-party SFE system 100 that can implement the features of the present invention. As shown in FIG. 1, memory 130 configures the processor 120 to implement the generic two-party SFE methods, steps, and functions disclosed herein (collectively, shown as 150 in FIG. 1). The generic two-party SFE methods 150 further comprise a GC generator 300, discussed further below in conjunction with FIG. 3. The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of computer system 100 can be incorporated into a personal computer, laptop computer, handheld computing device, application-specific circuit or general-use integrated circuit.

Generic Two-Party SFE Algorithms

As previously indicated, existing generic two-party SEE algorithms typically employ Garbled Circuits (GCs). Y. Lindell and B. Pinkas, "A Proof of Yao's Protocol for Secure Two-Party Computation," Journal of Cryptology, 22(2):161-188 (2009). For a detailed discussion of exemplary existing generic two-party SFE algorithms, see, for example, Payman Mohassel and Matthew Franklin, "Efficiency Tradeoffs for Malicious Two-Party Computation," Moti Yung et al., editors, PKC 2006: 9th International Conference on Theory and Practice of Public Key Cryptography, Vol. 3958 of Lecture Notes in Computer Science, 458-473 (New York, N.Y.; Apr. 24-26, 2006); Yehuda Lindell and Benny Pinkas, "An Efficient Protocol for Secure Two-Party Computation in the Presence of Malicious Adversaries," Moni Naor, editor, Advances in Cryptology—EUROCRYPT 2007, Vol. 4515 of Lecture Notes in Computer Science, 52-78 (Barcelona, Spain, May 20-24, 2007); David P. Woodruff, "Revisiting the Efficiency of Malicious Two-Party Computation," In Moni Naor, editor, Advances in Cryptology—EUROCRYPT 2007, Vol. 4515 of Lecture Notes in Computer Science, 79-96 (Barcelona, Spain, May 20-24, 2007); Stanislaw Jarecki and Vitaly Shmatikov, "Efficient Two-Party Secure Computation on Committed Inputs," In Moni Naor, editor, Advances in Cryptology—EUROCRYPT 2007, Vol. 4515 of Lecture Notes in Computer Science, 97-114 (Barcelona, Spain, May 20-24, 2007); and/or Vipul Goyal et al., "Efficient Two Party and Multiparty Computation Against Covert Adversaries," In Nigel P. Smart, editor, Advances in Cryptology—EUROCRYPT 2008, Vol. 4965 of Lecture Notes in Computer Science, 289-306 (Istanbul, Turkey, Apr. 13-17, 2008), each incorporated by reference in its entirety.

Secure Two-Party Computation

Garbled Circuits (GC)

Figure 2:
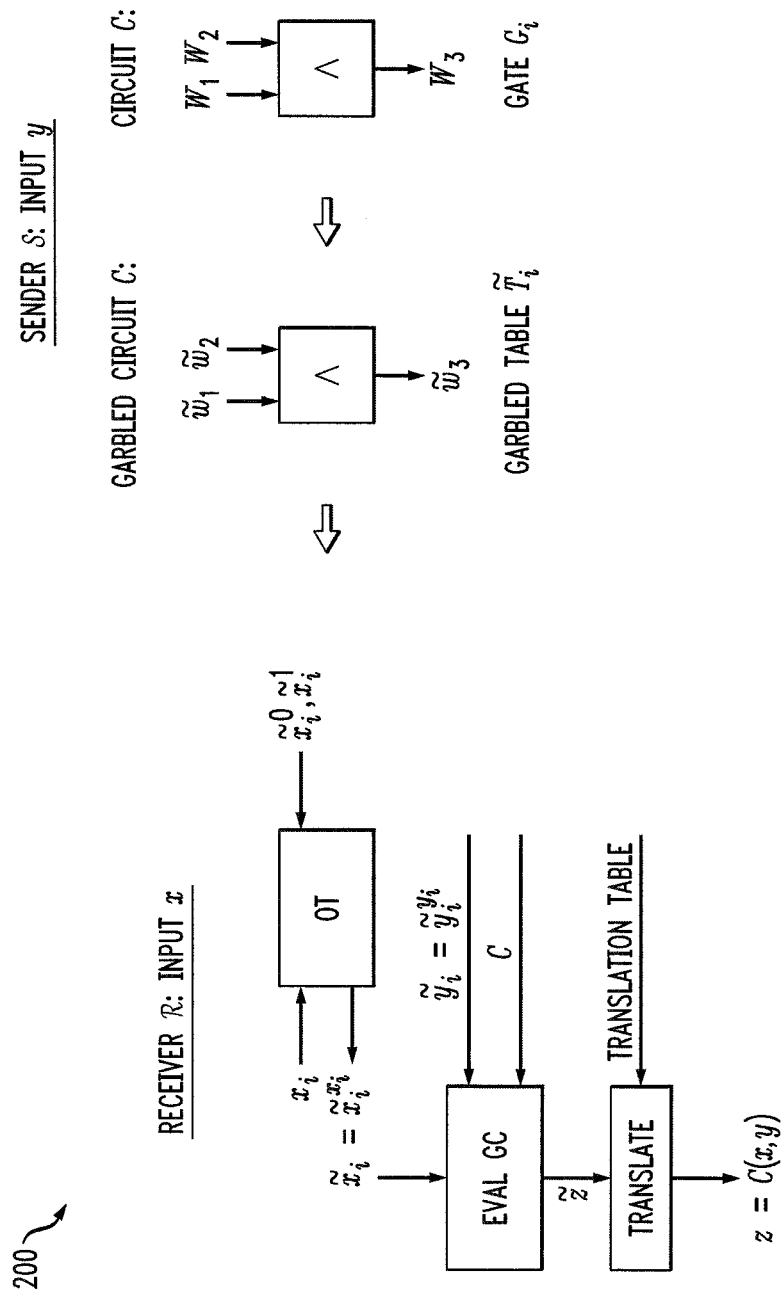
FIG. 2 is a block diagram of Garbled Circuit-based SIT.

FIG. 2 is a block diagram of a Garbled Circuit-based SFE 200. Generally, as shown in FIG. 2, Yao's Garbled Circuit (GC) approach allows two parties, sender S with private input y and receiver R (also referred to as client C) with private input x, to securely evaluate a boolean circuit C on (x, y) without revealing any information other than the result z=C (x, y) of the evaluation. In particular, no intermediate values are revealed.

The circuit constructor S creates a garbled circuit $\tilde{C}$ from the circuit C: for each wire $W_i$ of C, two garblings $\tilde{w}_i^0, \tilde{w}_i^1$ are randomly chosen, where $\tilde{w}_i^j$ is the garbled value of $W_i$'s value j. (Note: $\tilde{w}_i^j$ does not reveal j). Further, for each gate $G_i$, S creates a garbled table $\tilde{T}_i$ with the following property: given a set of garbled values of $G_i$'s inputs, $\tilde{T}_i$ allows to recover the garbled value of the corresponding $G_i$'s output. S sends these garbled tables, together called garbled circuit $\tilde{C}$, to evaluator (receiver R).

Additionally, R (obliviously) obtains the garbled inputs $\tilde{w}_i$ corresponding to the inputs of both parties: the garbled inputs $\tilde{y}$ corresponding to the inputs y of S are sent directly: $\tilde{y}_i = \tilde{y}_i^{y_i}$. For each of R's inputs $x_i$, both parties run a 1-out-of-2 Oblivious Transfer (OT) protocol (e.g., Y. Ishai et al., "Extending Oblivious Transfers Efficiently," Advances in Cryptology—CRYPTO 2003 (August 2003), D. Boneh, Ed., Lecture Notes in Computer Science, Vol. 2729, Springer, 145-161 (2003); or Jesper Buus Nielsen, "Extending Oblivious Transfers Efficiently—How to get Robustness Almost for Free," Cryptology ePrint Archive, Report 2007/215 (2007), where S inputs $\tilde{x}_i^0, \tilde{x}_i^1$ and R inputs $x_i$. The OT protocol ensures that R receives only the garbled value corresponding to his or her input bit, i.e., $\tilde{x}_i = \tilde{x}_i^{s_i}$, while S learns nothing about $x_i$.

Now, R evaluates the garbled circuit $\tilde{C}$ (which comprises the garbled tables $\tilde{T}_i$) on the garbled inputs to obtain the garbled output $\tilde{z}$ by evaluating $\tilde{C}$ gate by gate, using the garbled tables $\tilde{T}_i$. Finally, R determines the plain value z corresponding to the obtained garbled output value using an output translation table sent by S.

Embodiments of the invention provide a protocol for securely computing a function $f$, represented by a circuit C, where semi-honest S has input y and semi-honest C has input x.

For a more detailed discussion of Yao's Garbled Circuit approach, see, for example, A. C.-C. Yao, "How to Generate and Exchange Secrets (Extended Abstract)," FOCS, 1.62-67, (1986), incorporated by reference herein.

Efficient Information-Theoretic GC for Shallow Circuits (GESS)

V. Kolesnikov, "Gate Evaluation Secret Sharing and Secure One-Round Two-Party Computation," Advances in Cryptology—ASIACRYPT 2005 (December 2005), B. K. Roy, Ed., Lecture Notes in Computer Science, Vol. 3788, 136-55 (2005), incorporated by reference herein, describes a Gate Evaluation Secret Sharing (GESS) scheme, which is an efficient information-theoretic analog of GC. The discloses techniques perform encryption with bitwise XOR functions and bit shufflings, rather than with standard primitives such as AES. Thus. GESS is considered more efficient than standard GC, both in computation and communication, for shallow circuits.

Generally, GESS is a secret sharing scheme, designed to match with the gate function g, as follows. The output wire keys are the secrets, from which the constructor produces four secret shares, one for each of the wire keys of the two input wires. GESS guarantees that a combination of shares, corresponding to any of the four possible gate inputs, reconstructs the corresponding key of the output wire. This secret sharing can be applied recursively, enabling reduction of SFE to oblivious transfer (to transfer the wire secrets on the input wires).

V. Kolesnikov, "Gate Evaluation Secret Sharing and Secure One-Round Two-Party Computation," provides a SFE protocol for a boolean formula F of communication complexity $\approx \Sigma d_i^2$, where $d_i$ is the depth of the i-th leaf of F. This improvement provides better performance than standard GC by evaluating thin slices of the circuit. Other Information-Theoretic GC variants can also be used, with corresponding performance disadvantage.

Notation.

Let κ be the computational security parameter. The disclosed SFE protocol is given a circuit C which represents a function $f$ that a server S (with input y) and a client C (with input x) wish to compute. Let d denote the depth of C. The disclosed SFE protocol proceeds by dividing the circuit C into horizontal slices. Let l denote the number of such slices, and let $C_1, \ldots, C_l$ denote these l slices of C. d' denotes the depth of each slice $C_i$.

In circuit slice $C_i$, let $u_{i,j}$ (resp. $v_{i,j}$) denote the j th input (resp. output) wire. For a wire $u_{i,j}$ (resp. $v_{i,j}$), the garbled values corresponding to 0 and 1 are referred to by $\tilde{u}_{i,j}^0, \tilde{u}_{i,j}^1$ (resp. $\tilde{v}_{i,j}^{0}, \tilde{v}_{i,j}^{1}$) respectively. In the disclosed protocol, let k denote the length of input wire garblings. While evaluating the garbled circuit. C will possess only one of two garbled values for each wire in the circuit. Let $\tilde{u}'_{i,j}$ (resp. $\tilde{v}'_{i,j}$) denote the garbled value on wire $u_{i,j}$ (resp. $v_{i,j}$) that is possessed by C.

Protocol

Figure 3:
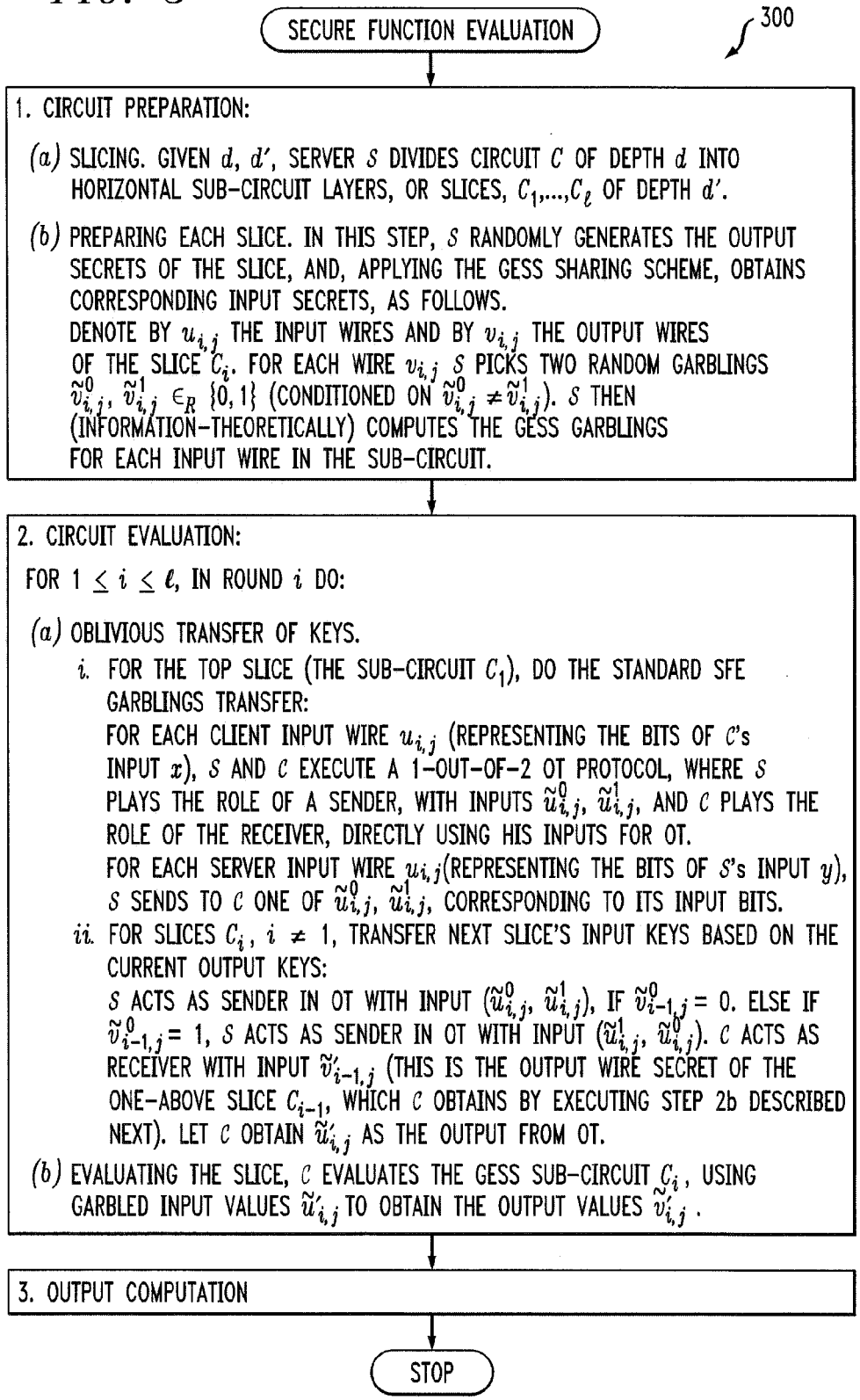
FIG. 3 is a flow chart describing an exemplary implementation of an SFE process that incorporates aspects of the present invention.

FIG. 3 is a flow chart describing an exemplary implementation of a secure function evaluator 300 incorporating aspects of the present invention. One embodiment of the exemplary secure function evaluator 300 of FIG. 3 uses oblivious transfer (OT), the standard 1-out-of-2 OT protocol, that is secure against a semi-honest sender and a semi-honest receiver.

Circuit C is evaluated slice-by-slice. Further, each slice is viewed as a fan-out-1 circuit, as needed for the GESS scheme discussed above.

1. Circuit Preparation:

(a) Slicing. Given d,d', server S divides circuit C of depth d into horizontal sub-circuit layers, or slices, $C_1, \ldots, C_l$ of depth d'.

(b) Preparing each slice. In this step, S randomly generates the output secrets of the slice, and, applying the GESS sharing scheme, obtains corresponding input secrets, as follows. Denote by $u_{i,j}$ input wires and by $v_{i,j}$ the output wires of the slice $C_i$. For each wire $v_{i,j}$, S picks two random garblings $\tilde{v}_{i,j}^{0}, \tilde{v}_{i,j}^{1} \in_R \{0,1\}$ (conditioned on) $\tilde{v}_{i,j}^{0} \neq \tilde{v}_{i,j}^{1}$). S then (information-theoretically) computes the GESS garblings for each input wire in the subcircuit, as described above. Let k be the maximal length of the garblings $\tilde{u}_{i,j}^{0}, \tilde{u}_{i,j}^{1}$ of the input wires $u_{i,j}$. Recall, GESS does not use garbled tables.

2. Circuit Evaluation:

For $1 \leq i \leq l$, in round i do:

(a) Oblivious transfer of keys.

i. For the top slice (the sub-circuit $C_1$), do the standard SFE garblings transfer:

For each client input wire $u_{1,j}$ (representing the bits of client C's input x), S an C client C execute a 1-out-of-2 OT protocol, where S plays the role of a sender, with inputs $\tilde{u}_{1,j}^{0}, \tilde{u}_{1,j}^{1}$, and client C plays the role of the receiver, directly using his inputs for OT.

For each server input wire $u_{1,j}$ (representing the bits of S's input y), S sends to client C one of $\tilde{u}_{1,j}^{0}, \tilde{u}_{1,j}^{1}$, corresponding to its input bits.

ii. For slices $C_i$, $i \neq 1$, transfer next slice's input keys based on the current output keys: S acts as sender in OT with input $(\tilde{u}_{i,j}^{0}, \tilde{u}_{i,j}^{1})$, if $\tilde{v}_{i-1,j}^{0} = 0$. Else if $\tilde{v}_{i-1,j}^{0} = 1$, S acts as sender in OT with input $(\tilde{u}_{i,j}^{1}, \tilde{u}_{i,j}^{0})$. Client C acts as receiver with input $\tilde{v}_{i-1,j}'$ (this is the output wire secret of the one-above slice $C_{i-1}$, which client C obtains by executing Step 1 described next). Let client C obtain $\tilde{u}_{i,j}'$ as the output from OT.

(b) Evaluating the slice. Client C evaluates the GESS sub-circuit $C_i$, using garbled input values $\tilde{u}_{i,j}'$ to obtain the output values $\tilde{v}_{i,j}'$.

3. Output of the Computation. Recall, without loss of generality, only client C receives the output. S now sends the output translation tables to client C. For each output wire of C, client C outputs the bit corresponding to the wire secret obtained in evaluation of the last slice $C_l$.

It can be shown that the above Protocol embodiment is secure against a semi-honest server S and a semi-honest client C.

In one exemplary embodiment, C is divided into l slices, each of depth d'=3. Let $\kappa=256$ be the key length on input wires of each slice.

System and Article of Manufacture Details

While FIG. 3 shows an exemplary sequence of steps, it is also an embodiment of the present invention that the sequence may be varied. Various permutations of the algorithm are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for secure function evaluation between a client and a server, comprising:
   obtaining a circuit, C, representing a function, $f$;
   preparing slices of said circuit, C, into a sequence of sub-circuits $C_1, \ldots C_l$, wherein each of said sub-circuits $C_1, \ldots C_l$ comprises a fan-out-one circuit;
   executing an oblivious transfer of keys for said sub-circuits $C_1, \ldots C_l$, to said client for evaluation, wherein input keys of one or more of said sub-circuits $C_1, \ldots C_l$, are based on output keys of a prior one of said sub-circuits $C_1, \ldots C_l$, wherein at least one of said sub-circuits $C_i$ has an output wire $w_j$ that is encrypted using only a one bit wire key, wherein said one bit wire key is used via said oblivious transfer to obtain a wire key for a corresponding input wire of a next sub-circuit $C_{i+1}$; and
   sending one or more output translation tables to said client.

2. The method of claim 1, wherein said step of preparing slices further comprises the steps of generating output secrets of a given sub-circuit $C_i$, and obtaining corresponding input secrets.

3. The method of claim 2, wherein said step of obtaining corresponding input secrets applies a Gate Evaluation Secret Sharing (GESS) sharing scheme.

4. The method of claim 2, wherein said given sub-circuit $C_i$, has input wires and output wires $u_{i,j}$ and wherein for each wire $v_{i,j}$, said server S selects two random output garblings $\tilde{v}_{i,j}^0, \tilde{v}_{i,j}^1 \in_R \{0,1\}$ (conditioned on $\tilde{v}_{i,j}^0 \neq \tilde{v}_{i,j}^1$) and computes garblings for each input wire in said given sub-circuit $C_i$.

5. The method of claim 1, wherein said step of executing said oblivious transfer of keys comprises a transfer of garblings for secure function evaluation for said sub-circuit $C_1$.

6. The method of claim 5, wherein said transfer of garblings for secure function evaluation for said sub-circuit $C_1$ comprises said server S executing for each client input wire $u_{1,j}$ representing bits of input x of said client C, a 1-out-of-2 oblivious transfer protocol, where S has input values $\tilde{u}_{1,j}^0, \tilde{u}_{1,j}^1$, and said client C uses input x for said oblivious transfer.

7. The method of claim 5, wherein said secure function evaluation garblings transfer for said sub-circuit $C_1$ comprises said server S sending to said client C for each server input wire $u_{1,j}$ representing bits of input y of said server S, one of input values $\tilde{u}_{1,j}^0, \tilde{u}_{1,j}^1$, corresponding to input bits of said server S.

8. The method of claim 1, wherein said step of executing said oblivious transfer of keys for said sub-circuits $C_2, \ldots C_l$, comprises performing said oblivious transfer with server input values $(\tilde{u}_{i,j}^0, \tilde{u}_{i,j}^1)$, if $\tilde{v}_{i-1,j}^0 = 0$ and performing said oblivious transfer with server input values $(\tilde{u}_{i,j}^1, \tilde{u}_{i,j}^0)$, if $\tilde{v}_{i-1,j}^0 = 1$.

9. A method for secure function evaluation between a client and a server, comprising:
   executing an oblivious transfer of keys for a plurality of sub-circuits $C_1, \ldots C_l$, from said server for evaluation, wherein said sub-circuits $C_1, \ldots C_l$ are a plurality of information-theoretic garblings of slices of a circuit, C, wherein each of said sub-circuits $C_1, \ldots C_l$ comprises a fan-out-one circuit, and wherein input keys of one or more of said sub-circuits $C_1, \ldots C_l$, are based on output keys of a prior one of said sub-circuits $C_1, \ldots C_l$, wherein at least one of said sub-circuits $C_i$ has an output wire $w_j$ that is encrypted using only a one bit wire key, wherein said one bit wire key is used via said oblivious transfer to obtain a wire key for a corresponding input wire of a next sub-circuit $C_{i+1}$;
   evaluating said sub-circuits $C_1, \ldots C_l$ using garbled input values to obtain garbled output values;
   receiving one or more output translation tables from said server; and
   generating a bit for each output wire of said circuit, C, corresponding to a wire secret obtained in evaluation of said sub-circuit $C_l$.

10. The method of claim 9, wherein said step of executing said oblivious transfer of keys for said plurality of sub-circuits $C_1, \ldots C_l$, comprises a transfer of garblings for secure function evaluation for a sub-circuit $C_1$.

11. The method of claim 9, wherein said step of executing said oblivious transfer of keys for said sub-circuits $C_2, \ldots C_l$, comprises performing said oblivious transfer with client input values $\tilde{v}'_{i-1,j}$, where $\tilde{v}'_{i-1,j}$ comprises an output wire secret of a prior sub-circuit $C_{i-1}$.

12. A server system for secure function evaluation with a client, comprising:
   a memory; and
   at least one hardware device, coupled to the memory, operative to:
   obtain a circuit, C, representing a function, $f$;
   prepare slices of said circuit, C, into a sequence of sub-circuits $C_1, \ldots C_l$, wherein each of said sub-circuits $C_1, \ldots C_l$ comprises a fan-out-one circuit;
   execute an oblivious transfer of keys for said sub-circuits $C_1, \ldots C_l$, to said client for evaluation, wherein input keys of one or more of said sub-circuits $C_1, \ldots C_l$, are based on output keys of a prior one of said sub-circuits $C_1, \ldots C_l$, wherein at least one of said sub-circuits $C_i$ has an output wire $w_j$ that is encrypted using only a one bit wire key, wherein said one bit wire key is used via said oblivious transfer to obtain a wire key for a corresponding input wire of a next sub-circuit $C_{i+1}$; and
   send one or more output translation tables to said client.

13. The server system of claim 12, wherein said slices are prepared by generating output secrets of a given sub-circuit $C_i$, and obtaining corresponding input secrets.

14. The server system of claim 12, wherein said oblivious transfer of keys comprises a transfer of garblings for secure function evaluation for said a sub-circuit $C_1$.

15. The server system of claim 14, wherein said transfer of garblings for secure function evaluation for said sub-circuit $C_1$ comprises said server system S executing for each client input wire $u_{1,j}$ representing bits of input x of said client C, a 1-out-of-2 oblivious transfer protocol, where S has input values $\tilde{u}_{1,j}^0, \tilde{u}_{1,j}^1$, and said client C uses input x for said oblivious transfer.

16. The server system of claim 14, wherein said secure function evaluation garblings transfer for said sub-circuit $C_1$ comprises said server system S sending to said client C for each server input wire $u_{1,j}$ representing bits of input y of said server system S, one of input values $\tilde{u}_{1,j}^0, \tilde{u}_{1,j}^1$, corresponding to input bits of said server system S.

17. The server system of claim 12, wherein said oblivious transfer of keys for said sub-circuits $C_2, \ldots C_l$, comprises performing said oblivious transfer with server input values $(\tilde{u}_{i,j}^0, \tilde{u}_{i,j}^1)$, if $\bar{v}_{i-1,j}^0 = 0$ and performing said oblivious transfer with server input values $(\tilde{u}_{i,j}^1, \tilde{u}_{i,j}^0)$, if $\bar{v}_{i-1,j}^0 = 1$.

18. A client system for secure function evaluation with a server, comprising:
   a memory; and
   at least one hardware device, coupled to the memory, operative to:
   execute an oblivious transfer of keys for a plurality of sub-circuits $C_1 \ldots C_l$, from said server for evaluation, wherein said sub-circuits $C_1, \ldots C_l$ are a plurality of information-theoretic garblings of slices of a circuit, C, wherein each of said sub-circuits $C_1, \ldots C_l$ comprises a fan-out-one circuit, and wherein input keys of one or more of said sub-circuits $C_1, \ldots C_l$, are based on output keys of a prior one of said sub-circuits $C_1, \ldots C_l$, wherein at least one of said sub-circuits $C_i$ has an output wire $w_j$ that is encrypted using only a one bit wire key, wherein said one bit wire key is used via said oblivious transfer to obtain a wire key for a corresponding input wire of a next sub-circuit $C_{i+1}$;

evaluate said sub-circuits $C_1, \ldots C_l$ using garbled input values to obtain garbled output values;

receive one or more output translation tables from said server; and generate a bit for each output wire of said circuit, C, corresponding to a wire secret obtained in evaluation of said sub-circuit $C_l$.

19. The client system of claim 18, wherein said step of executing said oblivious transfer of keys for said plurality of sub-circuits $C_1 \ldots C_l$, comprises a transfer of garblings for secure function evaluation for said sub-circuit $C_1$.

20. The client system of claim 18, wherein said step of executing said oblivious transfer of keys for said sub-circuits $C_2, \ldots C_l$, comprises performing oblivious transfer with client input values $\tilde{v}'_{i-1,j}$, where $\tilde{v}'_{i-1,j}$ comprises said output wire secret of a prior sub-circuit $C_{i-1}$.

* * * * *